United States Patent [19]

Ohki et al.

[11] Patent Number: 4,649,480
[45] Date of Patent: Mar. 10, 1987

[54] METHOD OF PROCEDURES LINKAGE CONTROL

[75] Inventors: Masaru Ohki, Kodaira; Toshio Hirosawa, Machida; Junichi Kurihara; Katsuto Miyazaki, both of Hachioji, all of Japan

[73] Assignee: Hitachi, Ltd., Tokyo, Japan

[21] Appl. No.: 716,940

[22] Filed: Mar. 28, 1985

[30] Foreign Application Priority Data

Mar. 28, 1984 [JP] Japan .................................. 59-58267

[51] Int. Cl.$^4$ .............................................. G06F 9/40
[52] U.S. Cl. ................................................... 364/300
[58] Field of Search ........................................ 364/300

[56] References Cited

U.S. PATENT DOCUMENTS 4,567,574 1/1986 Saade et al. ...................... 364/300 X Primary Examiner—Raulfe B. Zache
Attorney, Agent, or Firm—Antonelli, Terry & Wands

[57] ABSTRACT

An argument which is a set consisting a global variable in a procedure to be called, a designation symbol representing localization and a variable or constant on a procedure call side is designated as an argument of a procedure call statement of a program, the global variable in the called procedure is localized in the procedure in response to the designated information, and the value of the variable on the procedure call side which is a member of the set is used as the initial value of the local variable.

An argument which is a set consisting of a local variable in a procedure to be called, a designation symbol representing globalization and a variable on a procedure call side is designated as an argument of a procedure call statement of a call program, the local variable in the called procedure is globalized in response to the designation information, and a data area which is the same as that of the variable on the procedure call side, which is a member of the set, is used.

A procedure call statement is designated by omitting an argument of a procedure call statement of a call program, the omitted argument in the procedure is processed as a global variable, and a data area which is the same as that of a variable on the procedure call side, which has the same name as that of the argument in the procedure, is used.

6 Claims, 31 Drawing Figures

201 — ⟨PROCEDURE CALL STATEMENT⟩ ::= ⟨PROCEDURE NAME⟩ |
⟨PROCEDURE NAME⟩ ( ⟨ARGUMENT⟩ { , ⟨ARGUMENT⟩ } )

202 — ⟨PROCEDURE NAME⟩ ::= ⟨NAME⟩

203 — ⟨ARGUMENT⟩ ::= ⟨EXPRESSION⟩ | ⟨VARIABLE⟩ | ⟨PROCEDURE NAME⟩ | ⟨FUNCTION NAME⟩ |
⟨TWIN ARGUMENT⟩

204 — ⟨TWIN ARGUMENT⟩ ::= ⟨LOCAL TWIN ARGUMENTS⟩ | ⟨GROBAL TWIN ARGUMENTS⟩

205 — ⟨LOCAL TWIN ARGUMENTS⟩ ::= ⟨VARIABLE⟩ [ = ⟨VARIABLE⟩

206 — ⟨GROBAL TWIN ARGUMENTS⟩ ::= ⟨VARIABLE⟩ ] = ⟨VARIABLE⟩

METHOD OF PROCEDURES LINKAGE CONTROL

BACKGROUND OF THE INVENTION

This invention relates to a method of procedures linkage control which changes over the effective ranges of variables in the procedures of a program in accordance with procedure call methods.

A conventional procedure call system involves the problem that the effective range of variables used in one procedure can not be changed when other procedures are called by the declaration of called procedures or by the declaration of the variables in the procedures on the basis of the specification of a program language describing the procedures.

The effective ranges of variables of a conventional program language will be described with reference to a well known program language, PASCAL, by way of example.

The effective ranges of the variables in PASCAL will be explained with reference to FIG. 1. PASCAL itself is described in detail in ISO/DP 7185-Specification for the computer programming language PASCAL. In the drawing, reference numeral 100 represents a program as a whole. Reference numerals 110 and 120 represent a main program SCOPE and a procedure P, respectively. In the main program 120, variables a, b and c represented by 121, 112 and 113 are declared. In the procedure 120, variables a and b represented by 121 and 122 are declared. Reference numeral 123 represents a procedure call statement. To use the variables a and b in procedure 120 means the use of the variables declared at 121 and 122, but does not mean the use of the variables declared at 111 and 112. To use the variables declared at 121 and 122 in the procedure 120 when the variables a and b are used in the procedure 120 means that the variables a and b are "local" in the procedure 120. To use the variable c 123, which is not declared in the procedure 120, means that this variable c is "global" for the procedure 120.

The effective ranges of the variables a, b and c used in the program 100 are shown at 101. The effective ranges of the variables a, b and c declared at 111, 112 and 113 of the main program 100 are shown at 114, 115 and 116, respectively. The reason why the portions corresponding to the procedure 120 are represented by dotted lines in the ranges of 114, 115 and 116 is that the dotted portions are not effective. The effective ranges of the variables a and b declared at 112 and 121 of the procedure 120 are shown at 124 and 125. The effective ranges of 124 and 125 correspond to the range of the procedure 120, and are the same as the dotted portions 116 and 117 of the ranges 114 and 115.

As described above, whether a given variable is local or global is determined by the declaration of variables in PASCAL. Unless the declaration of the variables in the procedure is changed, the variables in the procedure can not be "localized" or "globalized".

Figure 2A:
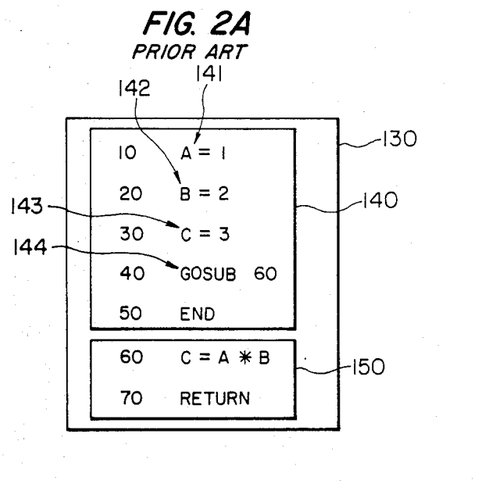
FIG. 2 is an explanatory view showing the effective range of BASIC.
Figure 2B:
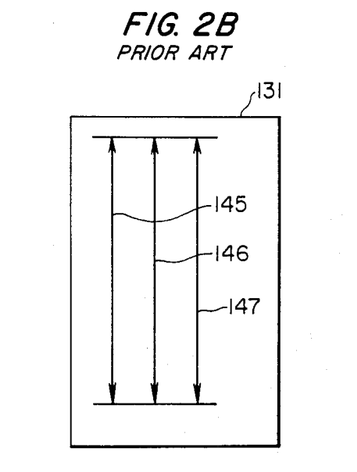

Next, the effective ranges of variables in BASIC will be described with reference to FIG. 2. BASIC is described in detail in "HITAC Manual VOS2/VOS3 BASIC Language" (8080-3-256; Hitachi, Ltd.). In the drawing, reference numeral 130 represents a program as a whole, and reference numerals 140 and 150 represent a main program and a procedure, respectively. The delivery of arguments can not be made in a GOSUB statement which calls a procedure, and declaration of a local variable can not be made, either, on the procedure side. This means that all the variables in the procedure are dealt with as global variables. The effective ranges of variables A, B and C used for instructions 141, 142 and 143 in the main program 140 are shown at 145, 146 and 147 in 131, respectively. In BASIC, the variables in the procedure called by GOSUB can not be localized in the procedure.

As described above, the effective ranges of the variables can not be changed in accordance with the procedure call methods in PASCAL and BASIC, so that the following problems develop.

(1) Procedures must be changed to change the effective ranges of variables in the procedures. When it is desired to use, in the main program 110, the value of the variable 122 in the procedure 120 for example, the number of arguments in the declaration statement 121 of the procedure 120 must be increased, or the declaration of the variable 122 must be released in the procedure 120.

(2) If the correction described in item (1) is made in one procedure call when a procedure is called from a plurality of locations, the rest of the procedure calls must also be corrected.

For example, if the number of arguments is increased in the declaration statement 121, the arguments must also be designated in all the procedure call statements. If the declaration of a variable in one procedure is released, the variable must be fixed at the call portion and a value must be given to it.

SUMMARY OF THE INVENTION

Figure 1A:
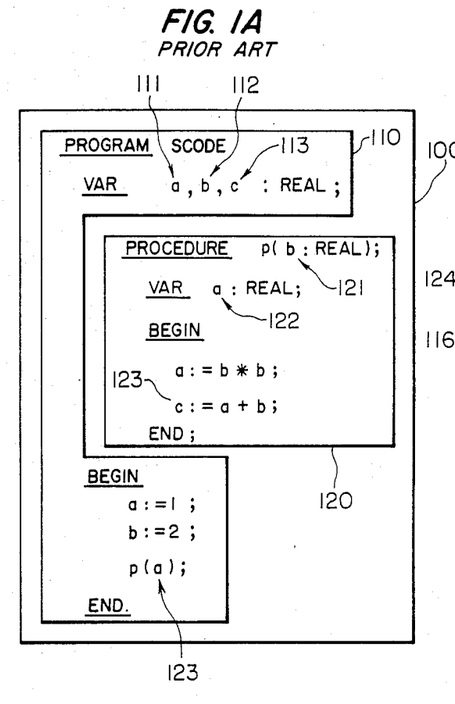
FIG. 1 is an explanatory view showing the effective range of PASCAL.
Figure 1B:
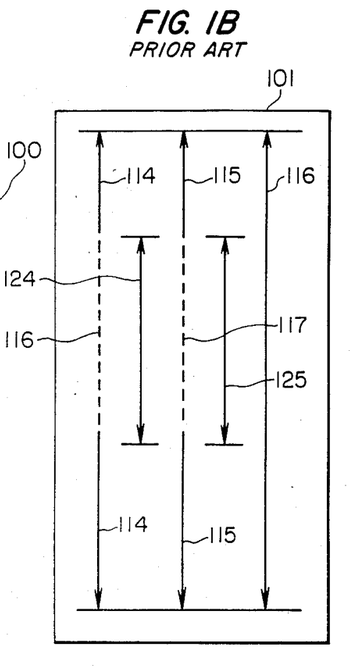

The present invention is directed to provide a system which makes it possible to carry out the following in accordance with the types of procedure call statements irrespective of the procedure call statements (the portion at which the names of procedures and tentative arguments are to be described; at 121 in FIG. 1) and irrespective of the declaration of variables when a given procedure is to be called:

(1) to change the effective ranges of variables in a procedure such as the change from global variables to local variables or vice versa, by designating the arguments of a procedure call statement, and (2) to eliminate the arguments of a procedure call statement and to treat the arguments in a declaration statement as global variables.

The system for changing over the effective ranges of variables in a procedure in accordance with the present invention means the addition of the following to a procedure call statement:

(1) The present invention makes it possible to describe one argument, which is a set consisting of a global variable in a procedure, a symbol representative of globalizing and a variable on the procedure call side, as an argument of a procedure call statement. The global variable in the procedure is localized in the procedure, and the value of the variable on the call side is put into the argument consisting of the set described above, as the initial value of the localized variable. This function can localize the global variable in the procedure without changing the procedure and deliver it the value.

(2) The present invention makes it possible to describe one argument, which consists of a set of symbols representative of globalizing a local variable in a procedure and a variable on the procedure call side, as an argument of a procedure call statement. A local variable in the procedure is globalized in the procedure, and the data region which is the same as that of the variable on the procedure call side of the set described above is used. This function can take out the value of the local variable from the procedure without changing the procedure.

(3) The present invention makes it possible to describe a procedure call statement while omitting the argument of the procedure call statement. The omitted argument is handled as a global variable, and the same data region as that of a variable on the call side which has the same name as the argument in the declaration statement is used for that argument. This funtion can omit the description of the argument in the procedure call statement when a procedure is to be called, if the argument of the call statement has the same variable name as the argument in the declaration statement.

To accomplish the functions described above, the present invention disposes a data stack for storing data and a variable pointer stack for designation a data region inside the data stack. To call a procedure, the pointer region and data region of the variable used on the procedure side are reserved, and the address of the data region of the argument in the call statement is stored in the pointer region of the argument in the declaration statement. To localize a global variable in a procedure, a data region is reserved afresh so that the pointer region of the global variable designates the data region. To globalize a local variable in a procedure, an arrangement is made so that the pointer region of the variable designates the data region of a pairing variable on the procedure.

DESCRIPTION OF THE PREFERRED EMBODIMENTS

Hereinafter, one embodiment of the present invention which is applied to PASCAL will be described.

In this embodiment, the following two systems are possible for changing over the effective ranges of variables in a procedure.

(A) In a procedure call statement, a set of variables consisting of a variable which is effective in the procedure, a symbol indicating whether the variable is to be localized or globalized and a variable which is effective on the call side and corresponds to the symbol is added to an argument, so that the effective ranges of variables effective in the procedure are changed and at the same time, the correspondence is established between the two variables.

(B) In a procedure call statement, arguments are omitted in order to globalize the arguments in a declaration statement.

In the method described above, the change of the effective ranges is effective in the procedure, and the effective ranges of all the variables are returned to the original ranges when returned from the procedure. However, the influence of the effective range arising from the call of the procedure remains.

Figure 3:
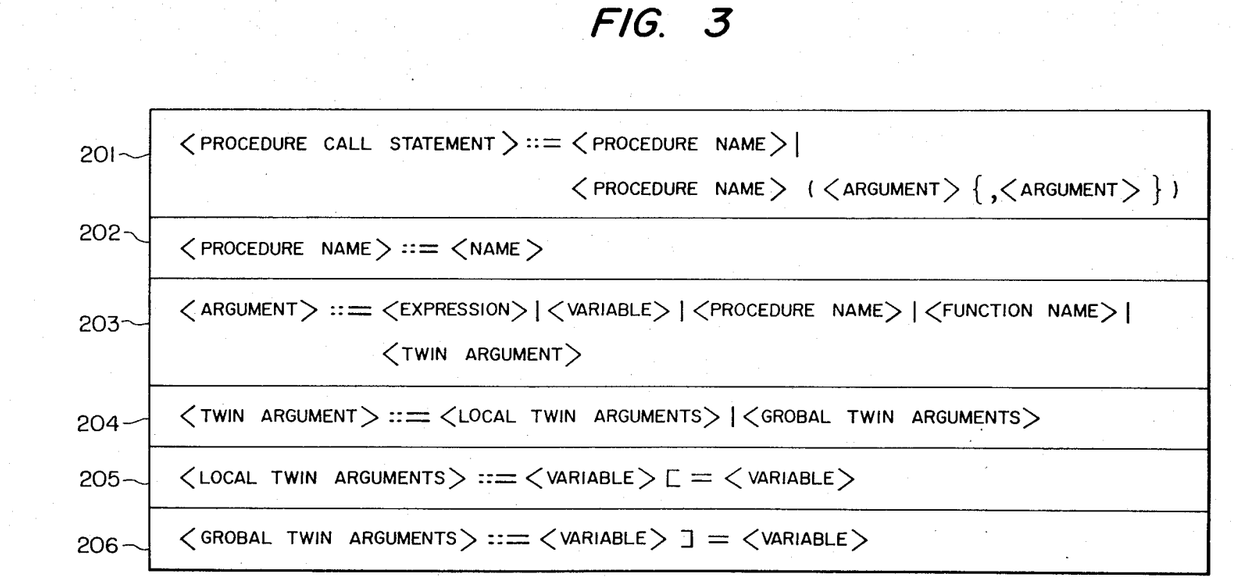
FIG. 3 is an explanatory view showing syntax in which the grammar of PASCAL has been changed and enlarged to realize the present invention.

To accomplish the system (A), a part of the syntax of PASCAL is changed. The changed portion relates to the "procedure call statement", and its syntax is shown in FIG. 3. The syntax of FIG. 3 expresses grammar with the BNF (Backus-Naur-Form) method. The overall syntax of PASCAL is described in Appendix B of the aforementioned HITAC Manual VOS2/VOS3 PASCAL.

In FIG. 3, reference numeral 201 represents the syntax of a procedure call statement. This is a three-way syntax, i.e., when only a procedure name exists, when a procedure name and one argument exist and when a procedure name and two arguments exist.

Reference numeral 202 represents the syntax of the procedure name, in which the name of the procedure itself is to be dealt with.

Reference numeral 203 represents the syntax of the argument of a call statement, which is any expression, a variable, a procedure name, a function name and a twin argument. The following description will deal only with the variable and the twin argument.

Reference numeral 204 represents the syntax of a twin argument, which consists of a local twin argument or a global twin argument. This is used for localizing or globalizing the variables in a procedure.

The local twin argument is expressed by a combination of a variable which is globally effective in a procedure, a symbol "[=" indicating that the variable is to be localized, and a variable which is effective on the procedure call side. The function of the local twin argument is such that those variables which are globally effective in a procedure are made effective locally in a procedure and the values of variables effective on the call side are applied to them as the initial values.

The global twin argument is expressed by a combination of a variable which is locally effective in a procedure, a symbol "]=" indicating that the variable is globalized, and a variable which is effective on the procedure call side. The function of the global twin argument is such that those variables which are locally effective in a procedure are brought into agreement with those combined variables which are effective on the call side, and are globalized in the procedure. The term "agreement" used herein means that a region in which data is stored is used in common by the two variables. When a variable which is subject to the influence of processing in a procedure and is globalized in processing is updatad, the variable on the call side which forms the set described above is also updated.

The changes of the grammar in the present invention are the addition of a twin argument to the argument of the call statement of 203 and the addition of the syntax shown at 204, 205 and 206.

The syntax of PASCAL need not be changed to accomplish the method (B). However, if the argument designated at the declaration portion of a procedure is omitted when calling the procedure, the argument is brought into agreement with the variable having the same name in those variables which are effective on the call side, and is globalized in the procedure. In this case, too, the variable is affected by the processing of the procedure, in which it is made to agree, in the same way as the global twin argument.

Figure 4:
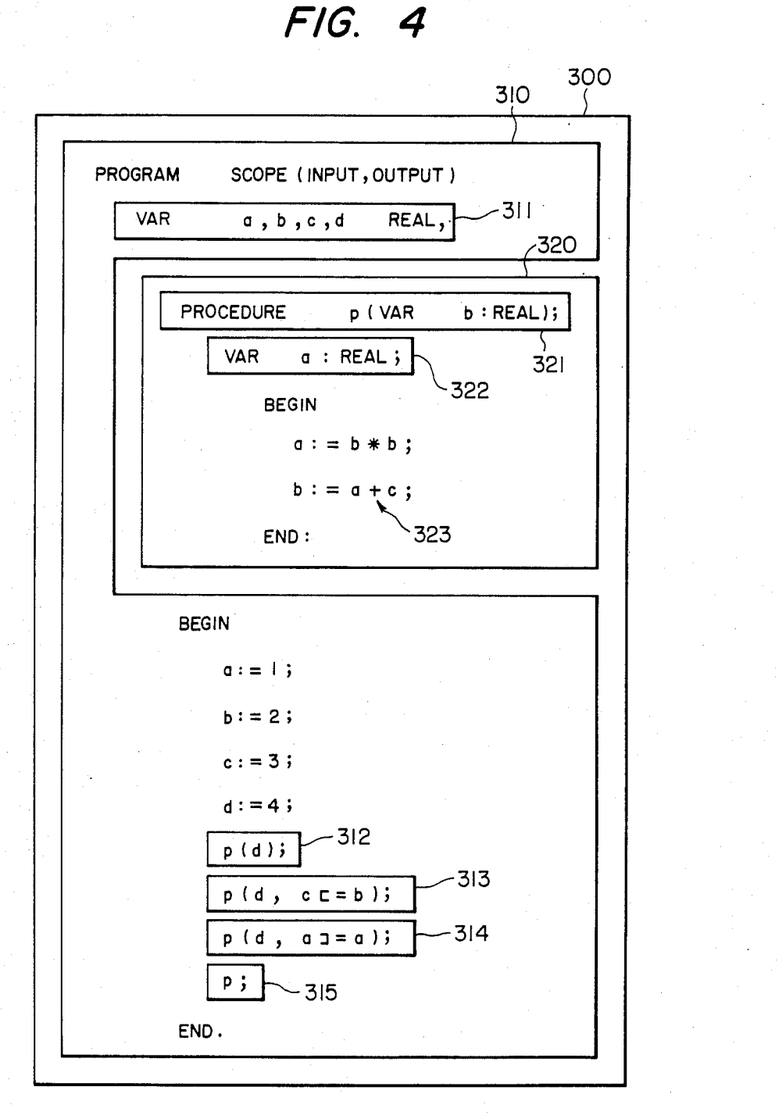
FIG. 4 shows an example of programs of the present invention.

An example of procedure call statement of a procedure C having one argument is shown in FIG. 4.

Reference numeral 300 represents a program as a whole, which consists of a main program "SCOPE" 310 and a procedure "P" 320. In the main program 310, variables a, b, c and d are declared at 311, and in the procedure "P" 320, variable b and a are declared as the arguments at 321 and 322, respectively. Reference numerals 312 through 315 represent a procedure call statement which calls the procedure "P" 320. Reference numeral 312 represents a conventional call, and the variables a and b are local in the procedure "P" 320. Reference numeral 313 represents an example in which a local twin argument is used. This is a procedure call statement for calling the procedure "P" 320 by converting a global variable C323 to a local variable in the procedure "P" 320, and then using the value of the variable b, which is effective in the main program 310, as the initial value. Reference numeral 314 represents an example in which a global twin argument is used. This is a procedure call statement for calling the procedure "P" 320 by converting a local variable a in the procedure "P" 320 to a global variable and then bringing it into agreement with the variable a in the main program 310.

Reference numeral 315 represents an example in which the procedure "P" 320 is called by omitting an argument. This is a procedure call statement for calling the procedure "P" 320 by globalizing an argument b of the declaration statement 321 in the procedure "P" 320 and then bringing it into agreement with the variable b in the main program 310. When the local variable in a procedure is globalized as in the examples of 314 and 315, the variable which is brought into agreement with the former is affected by the processing of the procedure.

Next, the change-over of the effective range will be described.

Figure 5:
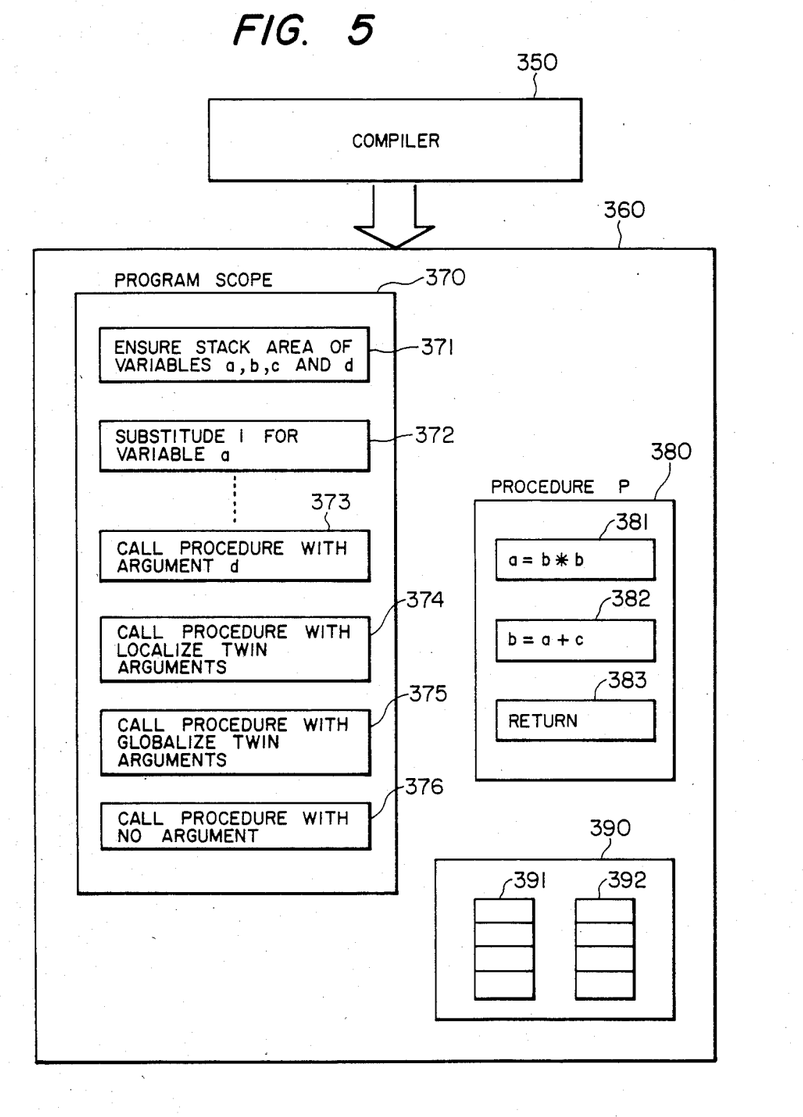
FIG. 5 shows an object program obrained by compiling the program of FIG. 4.

First of all, the summary of the embodiment will be described with reference to FIG. 5. FIG. 5 shows a compiler 350 for compiling the program 300 of FIG. 4 and an object program 360 as a result of compiling. Reference numeral 370 represents an object program portion of the main program 310 of the program 300, and reference numeral 380 represents an object program portion of the procedure "P" 320. In this embodiment, a stack 390 is used for the assignment of variables. Two stacks, i.e., a variable pointer stack 391 and a data stack 392, are used. Reference numerals 373, 374, 375 and 376 in FIG. 5 correspond to object programs of the procedure call statements 312, 313, 314 and 315 of FIG. 4, respectively. The principal processing in each of the procedure call statements is the assignment of a variable to the used for the procedure to the stack, the branch to the procedure and the release of the assignment of the variable used in the procedure. The main program 370 further includes processing 371 for assigning the variables 2, b, c and d to the variable pointer stack 391 and a processing 372 for storing the values of the variables in the data stack designated by the variable pointer stack.

The procedure "P" 380 includes processing 381 which squares the variable b to obtain the variable a, processing 382 which adds the variable a to the variable c to obtain the variable b and processing 383 which returns to the main program 370.

Next, processing the procedure call statement 373 will be explained with reference to FIGS. 6 and 7.

Figure 6:
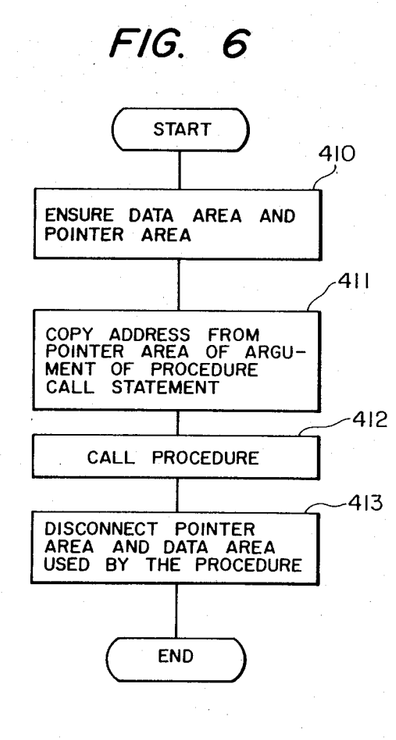
FIG. 6 shows a procedure call processing of conventional PASCAL.
Figure 7A:
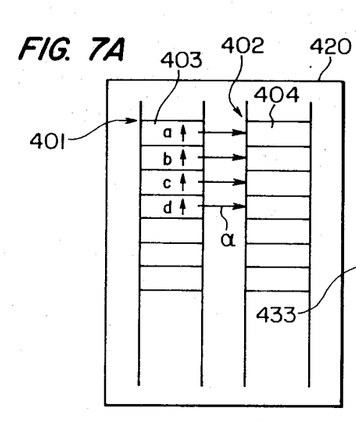
FIG. 7 shows the change of a variable pointer stack and a data stack in accordance with the processing of FIG. 6.
Figure 7B:
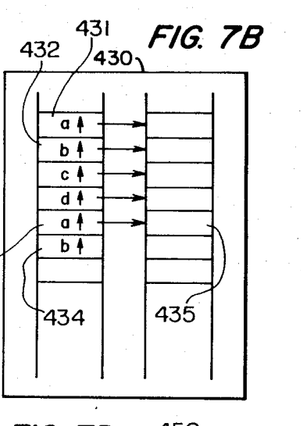
Figure 7C:
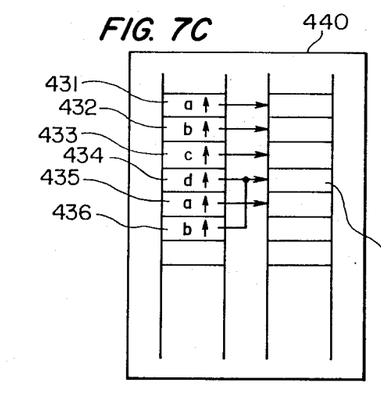
Figure 7D:
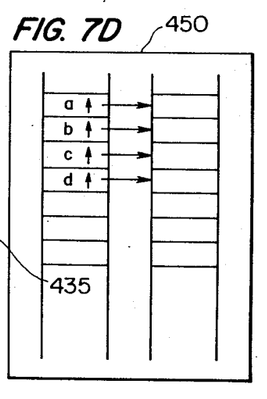

FIG. 6 shows the object program portion as a result of compiling of the procedure call statement 312 of FIG. 4. FIG. 7 shows the change of the stacks in accordance with processing in FIG. 6. In FIG. 7, reference numeral 401 represents the variable pointer stack, and 402 represents the data stack. The variable pointer stack consists of the aggregate of fields 403 designating the location of storage of the data assigned to the variables. The field 403 is referred to as a "pointer region". The pointer area assigned to a variable is represented by the name of the variable to which it is assigned, and by an arrow facing upward in the diagram. The data stack 402 consists of the aggregate of the fields 404 that actually store the data. The field 404 is referred to as the "data area". The correspondence between the pointer area and the data area is indicated by arrow a. The variable in the object program is represented by relative displacement in the variable pointer stack. The data area assigned to the variable is obtained in the following way:

address of data area=(address of origin of data stack)+[content of (relative displacement+address of origin of variable pointer stack)]

Reference numeral 420 in FIG. 7 represents the condition of the variable pointer stack and the data stack before a procedure is called. At this point in time, the variables a, b, c and d used in the main program 310 of FIG. 4 are assigned to the variable pointer stack at steps 371 and 372 of FIG. 5, and the values of the variables are stored in the data stack. As the preparation for the call, the variable pointer area as well as the data area to be used for the procedure "P" 320 are first reserved (at step 410). The condition of each stack at this time is shown at 430 in FIG. 7. The pointer areas that are reserved anew are 433 and 434, and a data area that is reserved anew is 435. The data area for the variable b 434 as the argument of the declaration statement 321 is not reserved. Next, the address of the content of the pointer area of the argument of the call statement is copied to the pointer area 434 assigned to the argument of the declaration statement (at step 411). The condition of each stack at this time is shown at 440 in FIG. 7. The pointer area of the variable b 436 as the argument of the declaration statement designates the data area 435 of the argument d 434 of the procedure call statement. When the data area of the variable used for the procedure is ensured, the procedure is called (at step 412). The variables a and b in the procedure determine the data area by using the pointer areas 435 and 436 but not using the pointer areas 431 and 432. The variables a and b are local in the procedure. The variables c and d determined the data areas using the pointer areas 433 and 434 used in the main program. The variables c and d are global in the procedure. After the processing of the procedure is completed, execution is returned to the next processing stage of the procedure call processing. The pointer area and data area of the variables used for the procedure are disconnected (at step 413). As a result, the condition 450 of the two stacks returns to the initial state 420.

Next, the procedure call statement using the local twin argument will be described with reference to FIGS. 8 and 9.

Figure 8:
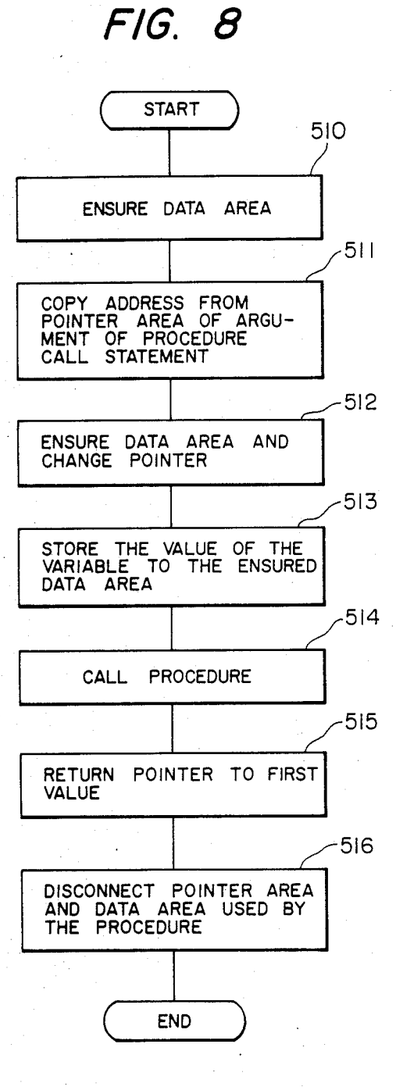
FIG. 8 shows procedure call processing using a local twin argument.
Figure 9A:
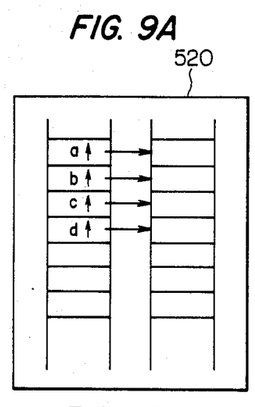
FIG. 9 shows the change of the two stacks in accordance with the processing of FIG. 8.
Figure 9B:
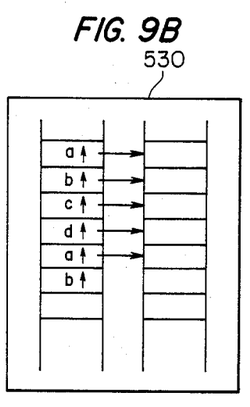
Figure 9C:
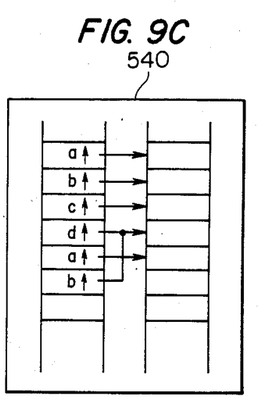
Figure 9D:
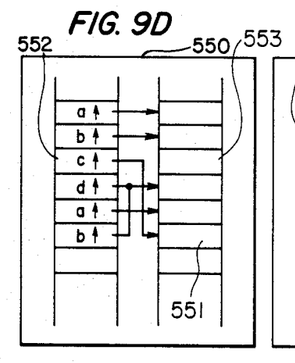
Figure 9E:
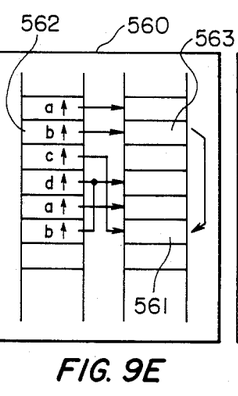
Figure 9F:
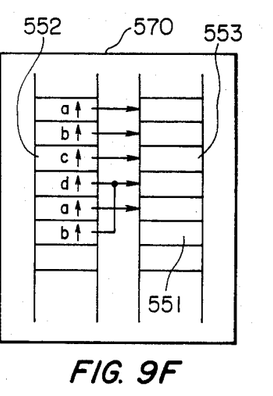
Figure 9G:
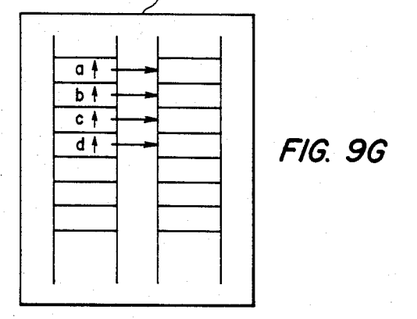

FIG. 8 shows the object program portion as a result of compiling of the procedure call statement of FIG. 4. The steps 510 and 511 in FIG. 8 are the same as the steps 410 and 411 in FIG. 6, respectively. Therefore, the stack condition 520-540 corresponds to the stack condition 420-440. When the data area of the variable used in the procedure is ensured, the data area 551 for the variable c to be localized, which is designated by the local twin argument, is ensured. The condition at this time is shown at 550. Next, the data area designated by the pointer area 552 is changed from 553 to 551 (at step 512). As shown by the stack condition 560, the value of the data area 563 of the variable b 562 on the call side, which is made to form a set by the local twin argument, is copied to the data area 561 of the local variable (at step 513).

After the processing described above is completed, the procedure is called (at step 514). After the processing of the procedure is completed, the data area designated by the pointer area of the local variable is changed from the data area 551 that is reserved anew to the original data area 553 as shown in the stack condition 570. Finally, the pointer and data areas of the variable used for the procedure and the area reserved anew by the local twin argument are disconnected (at step 516). As a result, the two stacks return from 580 to the original condition 520.

Figure 10:
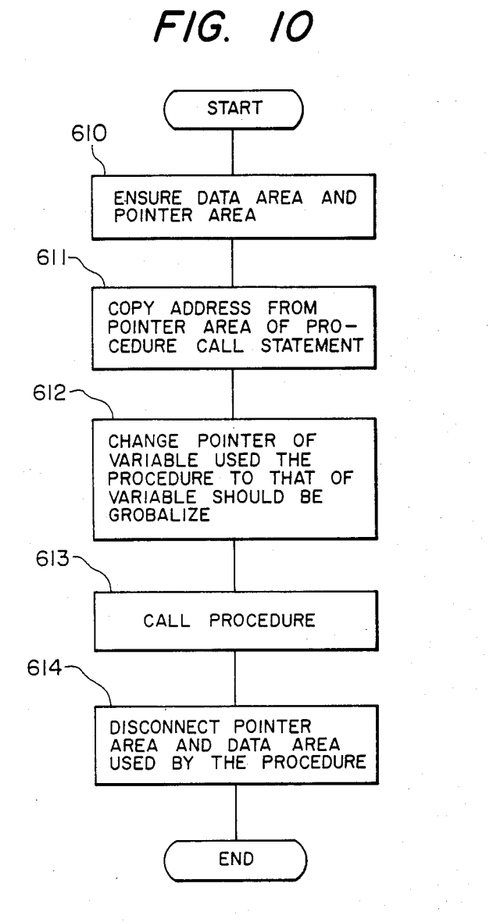
FIG. 10 shows procedure call processing using a global twin argument.
Figure 11A:
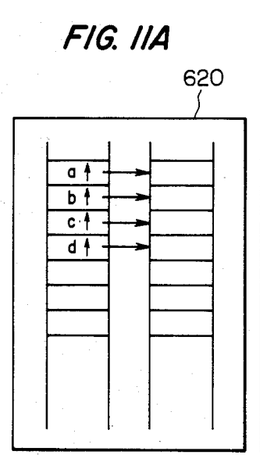
FIG. 11 shows the change of the two stacks in accordance with the processing of FIG. 10.
Figure 11B:
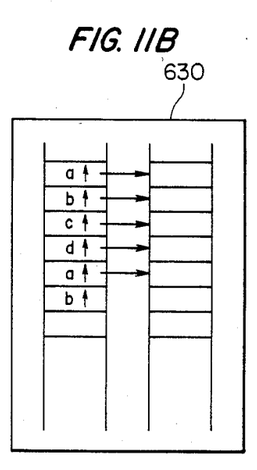
Figure 11C:
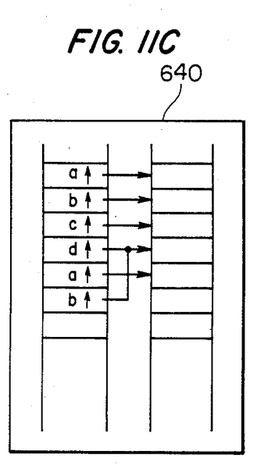
Figures 11D, 11E:
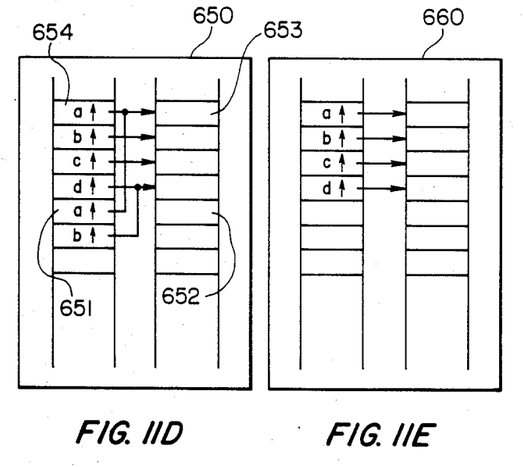

Next, procedure call processing using a global argument will be described with reference to FIGS. 10 and 11. FIG. 10 shows the object program as a result of compiling of the procedure call statement of FIG. 4. The processing at steps 610 and 611 shown in FIG. 10 is the same as the processing at the steps 410 and 411 shown in FIG. 6. Therefore, the stack conditions 620-640 correspond to the stack conditions 420-440. When the data area of the variable used for the procedure is ensured, the data area designated by the pointer area 651 of the variable a to be globalized, which is designated by the global twin argument, is changed from 652 to 653 as shown in the stack condition 650. Reference numeral 653 represents the data area designated by the pointer area 654 of the variable a effective on the call side, and this data area is to be brought into agreement with the variable a to be globalized. As a result, the local variable (variable a 654) and the variable (variable a 650) effective on the call side designate the same data area 653, and the variable which has been local in the procedure is globalized through the variable which is effective on the call side and is brought into agreement with the former (at step 612). After the processing described above is completed, the procedure is called (at step 613). After the processing of the procedure is completed, the processing shown at step 614 is executed. The processing at step 614 is the same as that of the step 413 in FIG. 4. As a result, the condition 660 of the two stacks returns to the initial condition 620.

Figure 12:
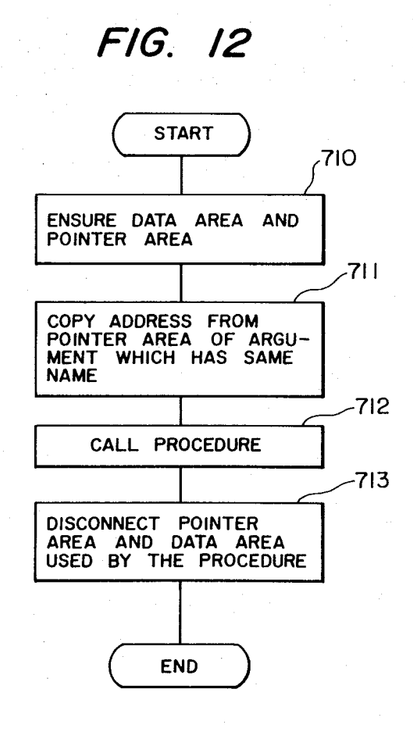
FIG. 12 shows procedure call processing when the argument is omitted.
Figure 13A:
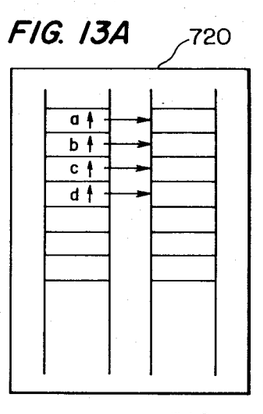
FIG. 13 shows the change of the two stacks in accordance with the processing of FIG. 12.
Figure 13B:
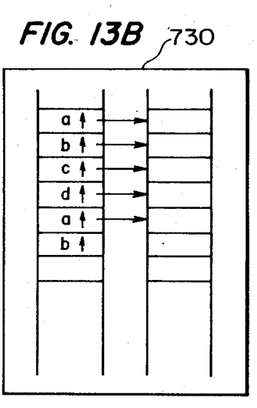
Figure 13C:
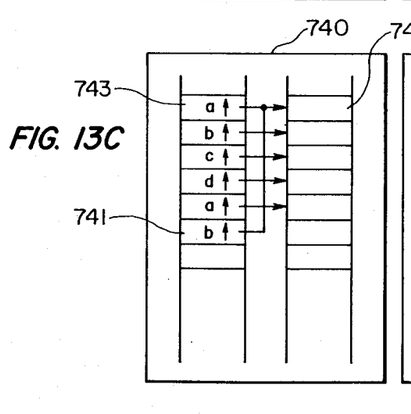
Figure 13D:
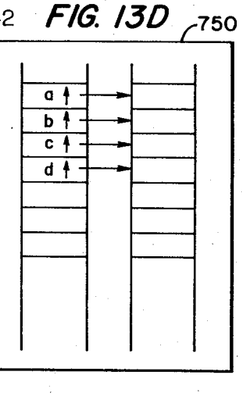

Finally, procedure call processing by globalizing the argument in the procedure call statement will be described with reference to FIGS. 12 and 13. FIG. 12 shows the object program as a result of compiling the procedure call statement at 315 in FIG. 4. The processing at 710, 712 and 713 in FIG. 12 is the same as the processing at 410, 412 and 413 in FIG. 6, respectively. Therefore, the stack conditions 720, 730 and 750 correspond to the stack conditions 420, 430 and 450, respectively. Here, only the processing at 711 will be described.

When the pointer and data areas of the variable used for the procedure are ensured, the data area designated by the pointer area 741 of the argument of the declaration statement is set to 742 (at step 711). The data area 742 is one that is designated by the pointer area 743 of the variable having the same name as the argument b of the declaration statement among the variables which are effective on the call side. As a result, the argument b of the declaration statement comes to designated the data area 742 which is the same as the variable on the call side having the same name, and hence the argument b is globalized. Incidentally, the data area on the call side having the same name as the argument b of the declaration statement is determined at the time of compiling before the processing described above is executed.

Though this embodiment is realized by a compiler no fundamental change is necessary with an interpreter. In the interpreter steps 312, 313, 314 and 315 in FIG. 4 are interpreted, and the processing stages shown in FIGS. 6, 8, 10 and 12 are selected and executed at the time of execution. The pointer area and the data area are also calculated at the time of execution.

Though the present invention uses a variable pointer stack and a data stack, it can be practised by use of a data stack alone. However, it is difficult to arrange it so that the local variable designates the same data area as the variable on the call side which is brought into agreement with the local variable, when the local variable in the procedure is globalized. When the present invention is realized with the data stack alone, the value of the variable on the call side which is brought into agreement with the local variable, and is copied to the data area of the local cariable. Strictly speaking, the local variable in this case can not be said to be globalized.

As described with reference to the embodiment given above, the present invention provides the following effects.

(1) The description of the local twin argument and the global twin argument to the argument of the procedure call statement is possible. The effective range of a variable in a procedure can be changed by the call of the procedure, and the change of the procedure due to the change of the effective range is not necessary. Since the change of the procedure is not necessary, partial change of the procedure call does not affect the other procedure call.

(2) The procedure can be called while omitting the argument of the procedure call statement. Since the argument of the declaration statement corresponding to the omitted argument of the procedure call statement is handled as being the same as the variable on the call side having the same name, procedure call having a large number of arguments can be simplified.

Though the embodiment given above illustrates the case where the present invention is applied to PASCAL, the invention can also be applied to BASIC. As described already, the procedure called by the GOSUB instruction of BASIC has the following two limitations:

(1) Declaration of the argument in the declaration statement is not permitted.

(2) Declaration of the local argument is not permitted.

Therefore, only a part of the present invention can be applied. It makes it possible to expand the GOSUB instruction in the following manner, to localize the global variable in the procedure and to deliver the value and constant of the variable on the call side to the localized variable.

GOSUB statement number [(variable on procedure side=variable on call side, ...)]

In the expansion described above, "[", "]" means that the description between two double quotation marks can be omitted. If the description is thus omitted, the grammar is the same as that of the conventional GOSUB instruction. If the description is not omitted, the variable on the procedure side is localized and at the same time, its data area is made to be the same as the data area of the variable on the call side forming the set with the former. In this manner, the call with the argument becomes possible in the GOSUB instruction in the same way as in the procedure statement of PASCAL.

In accordance with the present invention, the following becomes possible in accordance with the procedure call systems without changing the procedure.

(1) to change the effective ranges of variables in a procedure such as the change from global variables to local variables or vice versa, by designating the arguments of a procedure call statement, and (2) to eliminate the arguments of a procedure call statement and to deal with the arguments in a declaration statement as global variables.

Because the above have been made possible, the present invention provides the following effects:

(1) The present invention makes it possible to localize a global variable in a procedure without changing the procedure, and to deliver the value or constant of a variable on the call side to the localized variable.

(2) The present invention makes it possible to take out the value of a local variable from a procedure.

(3) The present invention makes it possible to make a description by omitting an argument of a procedure call statement, and to shorten the description of the procedure call statement.

What is claimed is:

1. In a method of procedure linkage control including a first procedure for executing a first processing stage and a second procedure for executing a second processing stage by utilizing the result of processing of said first procedure, a method of procedures linkage control characterized in that a first variable used in said first procedure and a first variable used in said second procedure are regarded as being different variables and said first procedure is called using the value of a second variable as the value of said first variable used in said first procedure in response to a designation symbol when said designation symbol, said first variable to be used in common for both of said first and second procedures and said second variable used in said second procedures are designated.

2. A method of procedures linkage control according to claim 1 wherein a first data memory area for storing the value of a variable is assigned to said first variable used in said first procedure separately from said first variable used in said second procedure when said first procedure is called, and the content of a second data memory area for said second variable is copied to said first data memory area.

3. A method of procedures linkage control according to claim 2 wherein said data memory area for storing the value for said variable is assigned to a data memory area which is the same as said data memory area for said second variable when said first procedure is called.

4. In a method of procedures linkage control including a first procedure for executing a first processing and a second procedure for executing a second processing by utilizing the result of processing of said first procedure, a method of procedures linkage control characterized in that said second procedure calls said first procedures by regarding a first variable as a second variable in response to a designation symbol when said first variable used in said first procedure, said designation symbol and said second variable used in said second procedure are designated.

5. In a method of procedures linkage control including a first procedure for executing a first processing and a second procedure for executing a second processing by utilizing the result of processing of said first procedure, said first procedure having a first variable used for executing said first processing, said second procedure having a second variable used for executing said second processing, both of said first and second variables having the same name, but said first variable being regarded as a different variable designated when said first procedure is called and being used for said first procedure, a method of procedures linkage control characterized in that said first variable is regarded as a variable which is the same as said second variable and said first procedure is called unless a variable is designated at the time of call of said first procedure.

6. A method of procedures linkage control according to claim 5 wherein a data memory area for storing the value for said second variable is assigned to a data memory area which is the same as a data memory area for said second variable unless a variable is designated at the time of call of said first procedure.

* * * * *